United States Patent [19]

Yu

[11] Patent Number: 4,852,230

[45] Date of Patent: Aug. 1, 1989

[54] METHOD OF FABRICATING ROLLERS FOR USE IN ROLLER CONVEYOR SYSTEMS

[75] Inventor: Thomas C. Yu, Cincinnati, Ohio

[73] Assignee: The Buschman Company, Cincinnati, Ohio

[21] Appl. No.: 177,253

[22] Filed: Apr. 4, 1988

[51] Int. Cl.[4] .................. B23P 11/00; B23P 19/02
[52] U.S. Cl. .................... 29/148.4 D; 29/432;
  29/412; 29/525; 29/116.1; 29/129; 193/37;
  384/536
[58] Field of Search ................. 29/432, 451, 417, 412,
  29/148.4 D, 525, 116, 129, 118, 119, 450;
  193/37; 198/781; 384/536, 582

[56] References Cited

U.S. PATENT DOCUMENTS

| | | | |
|---|---|---|---|
| 2,768,725 | 10/1956 | Foulds et al. | 193/37 |
| 3,287,069 | 11/1966 | Jonik | 29/148.4 D X |
| 3,301,612 | 1/1967 | Thomas | 384/536 |
| 3,353,644 | 11/1967 | McNash et al. | 193/37 |
| 3,610,387 | 10/1971 | Stein | 193/37 |
| 3,772,762 | 11/1973 | Stark | 29/525 X |
| 3,803,682 | 4/1974 | Stein | 29/116.1 |
| 4,108,303 | 8/1978 | Vogt et al. | 198/789 X |
| 4,153,559 | 5/1979 | Sanderson | 29/525 X |
| 4,345,678 | 8/1982 | Garnett | 193/37 X |
| 4,716,644 | 11/1988 | Crotti | 29/525 |

Primary Examiner—Charlie T. Moon
Attorney, Agent, or Firm—Frost & Jacobs

[57] ABSTRACT

A freerunning roller for use in a roller conveyor system comprises a cylindrical tube having saw cut ends providing a rough edge on each end which is relied upon to effect frictional interengagement with a relatively soft plastic cup dimensioned for force fitting into the tube and also dimensioned internally to receive a ball bearing in force fitted relation. The bearing assembly is completed by a bushing which is force fitted into the bearing and also has a hexagonal bore for receiving a hexagonal shaft by which the roller is mounted in a conveyor frame.

4 Claims, 1 Drawing Sheet

METHOD OF FABRICATING ROLLERS FOR USE IN ROLLER CONVEYOR SYSTEMS

BACKGROUND OF THE INVENTION

It has long been the practice in live roller conveyor systems to utilize rollers which include spring loaded axles mounted in receiving holes in the opposite side walls of the main conveyor frame, with each roller mounted on its axle by anti-friction bearings, as shown, for example, in Vogt et al U.S. Pat. No. 4,108,303 of 1976. It has also been conventional to utilize axles of non-circular section, such particularly as hexagonal axles, which simply need complementarily shaped receiving holes in the frame that hold the axles stationary with minimum wear between the axle and the frame.

In a recent development in the art, a bearing assembly for rollers of this type has been provided which includes a cup of a hard plastic material in which the antifriction bearing is mounted, and which is then inserted in the end of a cylindrical tube. In order to hold the bearing assembly and tube together, the outer end portion of the tube is compressed, as by swaging, to a slightly tapered shape forming a permanent interlock between the tube and the bearing and its surrounding cup. This roller is then mounted on its supporting axle by means of an axle adapter having a hexagonal bore and a cylindrical exterior which is received in the inner race of the bearing.

Rollers produced by this method for live roller conveyors have proved to be very successful in operation. However, the initial assembly is costly in requiring the equipment for and step of swaging the tube onto the supporting cup for the bearing. Also, in the event of wear of or damage to one of the bearings, it is impractically difficult to replace such bearings, because the interlock between the swaged ends of the tube and the bearing assemblies therein cannot be released without permanent damage to the tube.

SUMMARY OF THE INVENTION

The primary object of the present invention is to provide an improved construction of free running roller adapted for use in a live roller conveyor which utilizes components similar to those in the prior practice as summarized above, but which is significantly easier to manufacture and also significantly easier to disassemble for replacement of a bearing.

More specifically, the practice of the present invention begins with the production of the roller body by simply saw cutting a cylindrical tube of the desired diameter to the appropriate length, and thereby at the same time providing burred or otherwise rough edges on each end of the tube. Into each of these rough ends of the tube, there is press fitted an annular cup of a plastic or other material of a consistency which will readily adapt itself to the rough edges on the tube. Thus instead of requiring a specific swaging operation after the entire roller assembly has been inserted in the end of the tube, the invention relies on the roughened tube end to provide a frictional interlock with the cup. In addition, the cup includes a rim which abuts the end of the tube to provide a finished joint.

After the plastic cup has been seated in the end of the tube, an anti-friction bearing, such particularly as a ball bearing, is force fitted into the cup to complete the mechanical interconnection between the bearing and the tube. Thereafter, a bushing for supporting the axle is press fitted into the inner race of the bearing, and in the course of inserting these bushings, the spring loaded axle is also mounted within the tube, as explained in more detail hereinafter in connection with the preferred embodiment of the invention illustrated in the drawings.

DESCRIPTION OF THE PREFERRED EMBODIMENT

Figure 2:
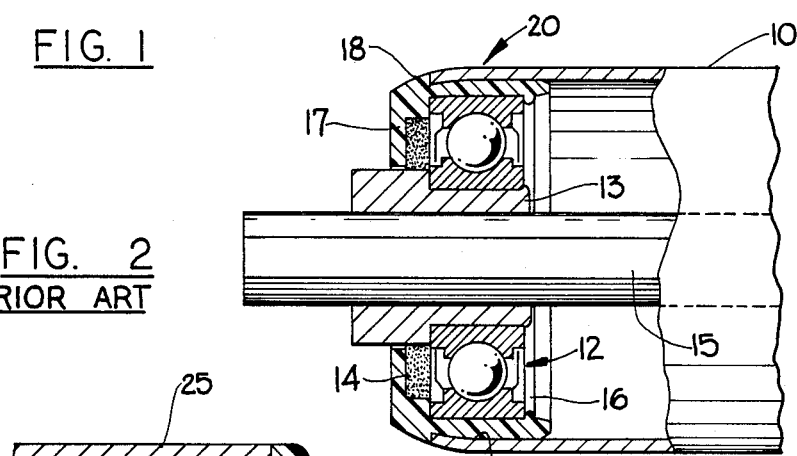
FIG. 2 is a fragmentary section through one end of a free running roller of the prior art.

The prior art end construction of a roller assembly shown in FIG. 2 includes a cylindrical tube 10, a hard plastic cup 11, a ball bearing 12, an axle adapter 13, a sealing member 14, and an axle 15. In fabricating this roller assembly, the bearing 12 is inserted in the plastic cup 11, in which it is retained between the annular lip 16 and the annular flange 17 at the inner and outer ends of the cup respectively. This assembly is then inserted in the end of the tube 10 until the annular outer flange 18 on cup 11 abuts the end of the tube.

In the next step, the end of the tube 10 is subjected to a crimping or swaging action which causes it to taper inwardly, as shown at 20, into compressing interlocking relation with the cup 11. The axle adapter 13, which has a cylindrical outer surface and usually a hexagonal bore, is press fitted into the inner race of the bearing 12, either before or after the crimping operation on the end of the tube 11.

This results in a firm interconnection between the tube 10 and the bearing assemblies at each of its ends. As noted above, however, this is a permanent interconnection which, as a practical matter, cannot be disassembled without destroying the tube 10. The present invention provides a similar construction which is not only simpler and less expensive from the standpoint of its assembly operation, but which provides an interconnection that is just as firm as with the prior art construction and also has the further advantage of being readily disassembled whenever that may be needed.

Figure 1:
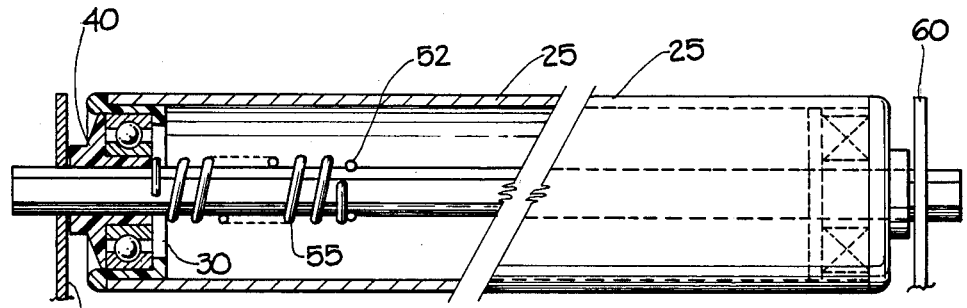
FIG. 1 is a longitudinal section through a roller assembly constructed in accordance with the present invention.
Figure 3:
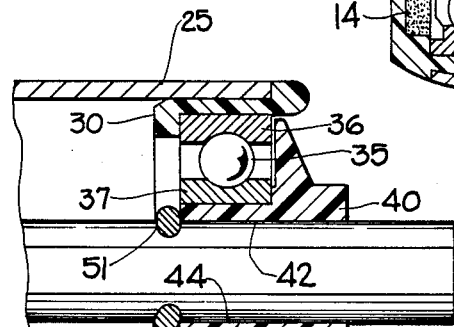
FIG. 3 is an enlargement of one end of the roller shown in FIG. 1.
Figure 4:
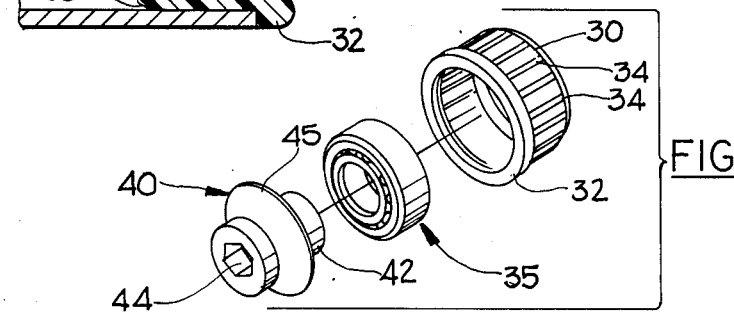
FIG. 4 is an exploded showing of the parts shown in FIG. 3.

Referring to FIGS. 1 and 3, the roller body is a section 25 of cylindrical tubing which has been saw cut to the desired length but with the saw cut ends unfinished in any way so that they remain rough or burred, particularly on the inside. The bearing assembly at each end of tube 25 includes a cylindrical cup 30 having an annular in-turned lip 31 at its inner end and a rim 32 at its outer end which projects radially beyond the outer surface of the body of the cup by a distance substantially equal to the thickness of the tube 25, but the cup 30 is uniformly cylindrical on its inner surface except for the inner end lip 31, with no portion like the flange 17 in FIG. 2.

In assembling the roller of the invention, the first step is to press a cup 30 into each end of the tubing 25, this operation being aided by the provision of a short lead-in taper 33 on the cup 30. Each cup is pressed into the tube to the full extent permitted by the rim 32, and the cup is formed of a material, such as polyurethane of 55D hardness, which is soft enough to adapt itself to the roughened edges of the tube, and indeed into which these roughened edges will penetrate to the extent that they are burred. This interaction is further promoted by the provision of axially extending ribs 34 on the outside of cup 30 between the rim 32 and the taper 33.

As an example of satisfactory dimensions where the tubing 25 where the tubing 25 has an inner diameter of 1.770 inches, the portion of the cup 30 which is inserted in the tubing may have the same outer diameter of 1.770 inches, there may be 24 ribs 34 equally spaced around the cup, and each of these ribs may be semi-cylindrical with a radius of 0.0065 inch. Thus when the cup 30 is forced into the end of the tubing 25, these ribs 34 become flattened as required to provide a firm interconnection between the cup and tubing while compensating for any irregularities which may exist around the inner circumference of the tubing.

In the next step, a ball bearing 35 is inserted in each cup 30, which is a simple operation because the cup 30 does not have an internal flange at its outer end as does the cup 10 of the prior art. The bearing 35 should have its outer race 36 of an outer diameter which will provide for its press fitting into the cup 30, and satisfactory results from this standpoint have been obtained with the race 36 having the same outer diameter as the initial inner diameter of the cup 30. More specifically, since the presence of the ribs 34 may cause the inner diameter of the cup 30 to be slightly reduced as it is pressed into the tubing 25, these ribs can be further compressed to the extent that insertion of the bearing 35 into the cup 30 requires expansion of the cup.

The remaining component of each bearing assembly is a bushing 40, preferably of the same material as the cup 30, which includes a tubular portion 42 having an internal hexagonal through bore 44. The outer surface of skirt 42 should be cylindrical and of a diameter for press fitting into the inner race 37 of bearing 35. In addition, the bushing 40 includes at its outer end a skirt or flange portion 45 of substantially greater outer diameter than its tubular portion 42.

The purpose of the bushings 40 is to support an axle 50 of hexagonal section within the roller assembly, with this axle being spring loaded to facilitate its mounting in a conveyor frame. The portion of the axle inside the tube 25 is provided with a pair of shoulders 51 and 52, which may be formed by upsetting portions of the axle itself, or by a C-ring or the like mounted in a groove in the axle. The axle assembly also includes a coil spring 55 mounted thereon for compression between the shoulder 52 and the end of the adjacent bushing 40.

In completing the assembly of the roller of the invention, a bushing 40 is first mounted at one end of the tube 25, by press fitting this bushing as far as it will go from outside the tube into the inner race 37 of the bearing 35 already mounted in the tube. The axle 50, with the spring 55 mounted thereon, is then inserted from the other end of the tube and fitted through the installed bushing 40.

The other bushing 40 is then slipped over the other end of the axle and press fitted into the remaining bearing 35. The complete roller assembly is then ready for mounting in opposed hexagonal holes in the conveyor frame indicated fragmentarily at 60. The end of axle 50 having the spring 55 thereon, namely the left-hand end of the axle as shown in FIG. 1, is inserted in its receiving hole in the frame. The other end of the axle is pushed into the roller assembly, against the biasing force of the spring 55, until it can be fitted inside the other part of frame 60 and then inserted in its receiving hole in the frame and caused to extend outwardly therethrough by the spring 55.

In addition to the fact that manufacture of roller assemblies in accordance with the invention requires no special equipment, and also eliminates the cost of finishing the cut ends of tubing required with the bearing assemblies of the prior art, the rollers of the invention can be easily disassembled without damage to any of their components.

The preferred procedure for this purpose is to force the sleeve 40 out of the right-hand end of the roller of FIG. 2, by forcing the axle 50 to the right so that the shoulder 51 thereon will force out the sleeve 40. The entire axle can then be withdrawn from the tube, after which the bearing 35 can also be pulled out. With the axle withdrawn from the other end of the tube, the bearing assembly there can then be similarly withdrawn, or knocked out, in stages or as a unit. Since this will leave the tube 25 undamaged, it can then be combined with additional bearing assemblies and put back in use.

While the apparatus herein described, and the method by which this apparatus is produced, constitute preferred embodiments of this invention, it is to be understood that the invention is not limited to this precise form of apparatus and method, and that changes may be made in either without departing from the scope of the invention, which is defined in the appended claims.

What is claimed:

1. The method of fabricating a free-running roller for use in a roller conveyor system which comprises the steps of:
   (a) saw cutting both ends of a cylindrical tube to a predetermined length having a rough edge on each end thereof,
   (b) press fitting into each end of said tube an annular cup composed of plastic material of a consistency which will readily adapt itself to said rough edge on said tube, and
   (c) press fitting an anti-friction bearing into each said cup.

2. The method defined in claim 1 wherein each said cup includes a radially outwardly projecting rim on the outer end thereof which is pressed into overlapping abutting relation with the adjacent said rough outer end of said tube by said press fitting step.

3. The method defined in claim 1 wherein the outer surface of said cup is of a diameter substantially equal to the inner diameter of said tube, and said surface includes a plurality of axially extending ribs which are compressed by said tube during said press fitting step.

4. The method defined in claim 1 further comprising the steps of:
   (a) press fitting an annular bushing into said bearing at one end of said tube,
   (b) inserting an axle through said tube and into said bushing,
   (c) fitting a second bushing on the other end of said axle, and
   (d) press fitting said second bushing into the other said bearing.

* * * * *